United States Patent
Lutz et al.

(10) Patent No.: US 12,111,649 B2
(45) Date of Patent: Oct. 8, 2024

(54) SECURITY-RELEVANT DIAGNOSTIC MESSAGES

(71) Applicant: Siemens Aktiengesellschaft, Munich (DE)

(72) Inventors: Benjamin Lutz, Pfinztal (DE); Anna Palmin, Karlsruhe (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 461 days.

(21) Appl. No.: 17/439,849

(22) PCT Filed: Mar. 16, 2020

(86) PCT No.: PCT/EP2020/057035
§ 371 (c)(1),
(2) Date: Sep. 16, 2021

(87) PCT Pub. No.: WO2020/187817
PCT Pub. Date: Sep. 24, 2020

(65) Prior Publication Data
US 2022/0187816 A1    Jun. 16, 2022

(30) Foreign Application Priority Data
Mar. 19, 2019 (EP) .................................... 19163776

(51) Int. Cl.
*G05B 23/02* (2006.01)
*H04L 41/069* (2022.01)
(Continued)

(52) U.S. Cl.
CPC ..... *G05B 23/0254* (2013.01); *G05B 23/0272* (2013.01); *H04L 41/069* (2013.01); *H04L 41/16* (2013.01); *H04L 41/22* (2013.01)

(58) Field of Classification Search
CPC ........ H04L 41/069; H04L 41/16; H04L 41/22
See application file for complete search history.

(56) References Cited

U.S. PATENT DOCUMENTS

| | | | |
|---|---|---|---|
| 10,789,367 B2 * | 9/2020 | Joseph Durairaj | .... G06N 3/043 |
| 2003/0065409 A1 | 4/2003 | Raeth et al. | |

(Continued)

FOREIGN PATENT DOCUMENTS

| | | | |
|---|---|---|---|
| CN | 107203199 | * | 6/2017 |
| DE | 2518969 | * | 10/2012 |

(Continued)

OTHER PUBLICATIONS

NPL Search History (Year: 2024).*
PCT International Search Report dated Jun. 26, 2020 based on PCT/EP2020/057035 filed Mar. 16, 2020.

*Primary Examiner* — Samson B Lemma
*Assistant Examiner* — Richard W Cruz-Franqui
(74) *Attorney, Agent, or Firm* — Cozen O'Connor

(57) ABSTRACT

A method for handling security alarms by a control system of a technical installation includes a) receiving diagnostic messages that have been generated by technical objects (7) of a technical installation; b) analyzing the diagnostic messages such that diagnostic messages relevant to the security of an operation of the technical installation are identified by means of comparative data records, where a machine learning network is used to analyze the diagnostic messages to assess the security relevance of the diagnostic messages, where the network is previously trained using special inputs from operators of the technical installation that have assessed past diagnostic messages with regard to their security relevance; c) if necessary, adapting the previously identified diagnostic messages to requirements of a computer-implemented security module of the technical installation and d) transmitting the previously identified and (Continued)

optionally adapted diagnostic messages to the computer-implemented security module of the technical installation.

10 Claims, 2 Drawing Sheets

(51) Int. Cl.
*H04L 41/16* (2022.01)
*H04L 41/22* (2022.01)

(56) References Cited

U.S. PATENT DOCUMENTS

| | | | | |
|---|---|---|---|---|
| 2012/0254313 | A1* | 10/2012 | Fake | G06F 11/3072 |
| | | | | 709/204 |
| 2015/0229660 | A1* | 8/2015 | Palmin | H04L 63/1416 |
| | | | | 726/23 |
| 2015/0381647 | A1* | 12/2015 | Huang | G06F 16/284 |
| | | | | 726/22 |
| 2016/0205069 | A1 | 7/2016 | Blöcher et al. | |
| 2017/0032091 | A1* | 2/2017 | Rudorfer | G16H 50/20 |
| 2017/0032130 | A1* | 2/2017 | Joseph Durairaj | |
| | | | | H04L 63/1416 |
| 2018/0219875 | A1* | 8/2018 | Bania | H04L 63/1425 |
| 2018/0268304 | A1* | 9/2018 | Manadhata | G06N 5/04 |
| 2018/0300572 | A1 | 10/2018 | Esman et al. | |
| 2018/0364660 | A1* | 12/2018 | Maresco | G05B 15/02 |
| 2019/0034767 | A1 | 1/2019 | Sainani et al. | |
| 2019/0116203 | A1* | 4/2019 | Chou | H04L 63/1458 |
| 2020/0028829 | A1* | 1/2020 | Falk | H04L 63/0428 |
| 2020/0336497 | A1* | 10/2020 | Seul | G06F 17/15 |
| 2020/0382361 | A1* | 12/2020 | Chandrasekhar | G06N 3/044 |
| 2021/0021612 | A1* | 1/2021 | Higbee | H04L 63/1491 |
| 2022/0078198 | A1* | 3/2022 | Gingras | G06F 40/295 |
| 2024/0012404 | A1* | 1/2024 | Palmin | H04L 63/20 |

FOREIGN PATENT DOCUMENTS

| | | |
|---|---|---|
| DE | 102013216847 | 2/2015 |
| EP | 2518969 | 10/2012 |

* cited by examiner

SECURITY-RELEVANT DIAGNOSTIC MESSAGES

CROSS-REFERENCE TO RELATED APPLICATIONS

This is a U.S. national stage of application No. PCT/EP2020/057035 filed 16 Mar. 2020. Priority is claimed on European Application No. 19163776.8 filed 19 Mar. 2019, the content of which is incorporated herein by reference in its entirety.

BACKGROUND OF THE INVENTION

1. Field of the Invention

The invention relates to a, a control system for a technical installation, in particular a manufacturing or process installation and to a method for handling security alarms by a control system of a technical installation.

2. Description of the Related Art

A proactive identification of indicators of possible attacks, anomalies and violations of guidelines, as well as the long-term storage of security-relevant information with the aid of appropriate tools, assumes particular significance in view of the increasing potential threat to technical installations. Proactive identification such as this and traceability based on the long-term storage of security-relevant information is even more important than hitherto, especially for the operators of critical installation infrastructures.

What are known as Security Information Event Management (SIEM) tools for the detection, correlation and long-term storage of "security events", as well as for the generation of alarms based on the correlation results, permit a significant increase in the protection level of components, systems and installations and contribute to conformity with the requirements of the relevant standards. Corresponding requirements are for example set out in the International Electrotechnical Commission (IEC) standard 62443-3-3.

A major prerequisite for a fruitful and successful use of such tools is that the components and systems used in the industrial installations detect various security events and can make them available via standardized interfaces.

For example, the SIMATIC S7 410 Industrial Controller from SIEMENS supports the security events referred to in IEC standard 62443-3-3. The security events can in this case be sent by a CPU of the controller in what are known as Syslog telegrams to up to four external SIEM servers.

A further important prerequisite is the presence of correlation rules tailored to the respective technical installation for the identification of indicators of various attack scenarios and violations of mandatory guidelines. Such rules can be divided into different general, standard-specific, industry-specific, IT-specific, manufacturer-specific and installation-specific categories.

The following findings have been obtained in recent years when trialing various SIEM tools and anomaly identification tools in the industrial environment:

Security events and identified network anomalies are indeed important but are sometimes insufficient for the comprehensive identification of attacks (in particular "sophisticated attacks", which specifically exploit weaknesses in a particular environment) and deviations. In the case of security events, this is due in particular to the fact that these were defined by the device/software or system manufacturer in the design phase, where not all scenarios that have been shown to be possible during subsequent use in a technical installation were known or could have been predicted in the design phase.

In the case of anomaly identification tools, this is because they either identify already known network attacks (such as IP spoofing, for example) or have to learn the normal behavior of the system over longer phases and can then only guess that a deviation from the normal behavior may be present, where they completely disregard the information from the devices (such as security events, for example).

For a comprehensive security diagnosis and attack identification tailored as well as possible to the respective technical installation, further information should also be taken into consideration, in particular information from various device components, including operator station servers, automation processes and field devices, detected system and device diagnostic messages, which though not by definition security-relevant, may nevertheless prove to be security-relevant in the specific installation context.

For example, all device diagnostic messages from the operator station server and the lower-level devices of the automation and field level of the technical installation along the automation pyramid are brought together in an operator station server.

The field devices report their diagnostic data as device diagnostic messages to the associated automation processes. The network devices report their diagnostic data as device diagnostic messages to the associated automation processes. The automation processes aggregate their own device diagnostic messages together with the device diagnostic messages from the field devices and network devices and report them to the operator station server. The operator station sever aggregates its diagnostic data with its device diagnostic messages and the aggregated device diagnostic messages from the automation processes and reports these to a maintenance station.

Thus, all device diagnostic messages that could be of relevance for "security analyses" are already present at the level of the operator station server for each sub-installation.

Device diagnostic messages in this case are messages (such as process alarms) which contain not only message texts but also numerous associated values, and are primarily designed for maintenance tasks. Because of the multiplicity of devices contained in a control system of a technical installation and the large numbers of diagnostic messages present per device, large quantities of diagnostic messages are present for each operator station server. Although it is technically possible for instance to have all the detected device diagnostic messages evaluated by a SIEM system, this is not expedient because not every diagnostic message is security-relevant in the specific installation context. In addition, not every diagnostic message is suitable for a security analysis.

An IT expert is generally responsible for a SIEM system installed in situ in a technical installation. Such an expert is generally not familiar (or not familiar in detail) with the automation components installed in the installation or with their diagnostic messages and security events. Thus, the IT expert can only draw up the correlation rules needed for anomaly detection inadequately (or not without support from the installation personnel or from automation experts) and adapt these optimally for the respective technical installation.

However, the installation personnel are generally primarily employed on tasks for the maintenance of the operation and availability of the installation, so that the joint formulation of necessary correlation rules occurs either only to a very limited extent or not at all. As a result, a large, unmanageable amount of different information (including various device diagnostic messages) reaches the SIEM systems.

While standard attacks (such as denial of service, IP spoofing, for example) can be identified by the fully automated realtime processing of this information based on particular IT-oriented or network-oriented correlation rules or identification rules, which are in part kept very general, targeted, installation-specific attacks cannot. No possibility has hitherto been known, in the context of a fully automated evaluation, for the corresponding automation or installation experts to be included if needed in the assessment of particular device diagnostic messages in respect of their security relevance.

SUMMARY OF THE INVENTION

It is an object of the invention to provide a more efficient alarm handling by a control system of a technical installation from the point of view of security.

This and other objects and advantages are achieved in accordance with the invention by, a control system for a technical installation, in particular a manufacturing or process installation, and by a method that comprises a) receiving diagnostic messages generated by objects of a technical installation, in particular a manufacturing or process installation, b) analyzing the diagnostic messages such that diagnostic messages relevant to the security of an operation of the technical installation are identified, where a machine learning network, in particular a neural network, is used to analyze the diagnostic messages to assess the security relevance of the diagnostic messages, the network having previously been trained using special inputs from operators of the technical installation, and operators having assessed past diagnostic messages with regard to their security relevance, c) if necessary, adapting the previously identified diagnostic messages to requirements of a computer-implemented security module of the technical installation, and d) transmitting the previously identified and optionally adapted diagnostic messages to the computer-implemented security module of the technical installation.

The technical installation can be an installation from the process industry, such as a chemical, pharmaceutical or petrochemical installation, or an installation from the food and beverage industry, for example. Also included are any installations from the production industry, plants in which, for example, cars or goods of all types are produced. Technical installations that are suitable for the performance of the inventive method can also come from the field of power generation. Wind turbines, solar installations or power plants for the generation of energy are likewise included in the term "technical installation".

These installations each have a control system or at least a computer-aided module for controlling and regulating the process being executed or the production. In the present context, a control system means a computer-aided technical system that comprises functionalities for representing, operating and controlling a technical system, such as a manufacturing or production installation. In the present case, the control system comprises sensors for identifying measurement values, as well as various actuators. Furthermore, the control system comprises what are known as process-related or manufacturing-related components that serve to control the actuators or sensors. Additionally, the control system has, among other things, means for visualizing the technical installation and for engineering. The term control system should additionally also be taken to include further computing units for more complex controls and systems for data storage and data processing.

A technical object can be individual sensors or actuators of the technical installation. However, a technical object can also be a combination of multiple sensors and/or actuators, such as a motor, a reactor, a pump or a valve system.

A message generally means a report of the occurrence of an event that represents a transition from one discrete state within the technical installation to another discrete state. Diagnostic messages represent special types of messages and besides the actual message texts include further associated values. The diagnostic messages (also called device diagnostic messages) are primarily designed for maintenance tasks in the technical installation occurring with regard to the respective technical objects.

An operator means a human operator of the technical installation. The operator interacts with the technical installation or its control system via special user interfaces and controls special technical functions of the installation. To this end, the operator can use an operator control and process monitoring system of the control system.

In accordance with the invention, diagnostic messages are first received from technical objects of a technical installation and are then analyzed. Comparative data records that permit an identification of diagnostic messages relevant for the security of an operation of the technical installation are used here. In other words, a classification of the diagnostic messages received into security-relevant or security-irrelevant messages is undertaken based on previously known data patterns.

For the purpose of analyzing the diagnostic messages to assess the security relevance of the diagnostic messages, a machine learning network, in particular a neural network, is used which has previously been trained with analysis data relating to previous diagnostic messages. This machine learning network is trained using special inputs from operators of the technical installation who have assessed past diagnostic messages with regard to their security relevance.

If necessary, the diagnostic messages are then subjected to a transformation in order to adapt them to the requirements of a computer-implemented security module. A requirement such as this can, for example, consist of a content and a structure of what are known as the auditable events, also called security events, explained in the IEC 62443-3-3 standard. The adaptation or transformation of the diagnostic messages previously identified as relevant then if needed occurs based on the content specifications codified in the IEC 62443-3-3 standard.

The previously identified and optionally adapted diagnostic messages are finally passed to the computer-implemented security module of the technical installation. A security module such as this can be a SIEM system, for example.

By filtering (and optionally adapting) the diagnostic messages the number of items of information forwarded to subsequent security analysis tools (or the security module) can be reduced to a large extent. Their information content and benefit in respect of identifying an attack on the technical installation is, however, considerably increased.

In an advantageous embodiment of the invention, the diagnostic messages transmitted to the computer-implemented security module are graphically presented to an operator of the technical installation. As a result, the operator is given a clear image of the security-relevant status of the technical installation.

It is possible for the machine learning network to be even better trained by further assessments by operators, in order for example, to adapt the learning network to changing basic security conditions.

During the automated assessment of the security relevance of a diagnostic message, a message class and/or a message type of the diagnostic message can be taken into account. Examples of message classes are: "automation station control system messages", "operator station server control system messages", "operator input messages" or "process messages". A message type can represent "alarm" or "fault", for example. The background is that individual diagnostic messages are generally assigned to individual message classes and message types, as a result of which the classification elucidated above can be considerably facilitated.

In connection with a preferred embodiment of the method, the diagnostic messages previously identified as relevant are adapted to a standard data format, preferably the Common Event Format, before the diagnostic messages are transmitted to the computer-implemented security module of the technical installation.

It is also an object of the invention to provide a control system of a technical installation, in particular a manufacturing or process installation, which comprises an operator station server, a computer-implemented analysis module, a computer-implemented adaptation module and a computer-implemented security module, where the analysis module and the adaptation module are implemented on the operator station server. In this case, the computer-implemented analysis module is configured to receive diagnostic messages generated by technical objects of a technical installation, in particular a manufacturing or process installation, and to analyze the diagnostic messages such that diagnostic messages relevant for the security of an operation of the technical installation are identified. In this case, the computer-implemented analysis module is configured, for the purpose of analyzing the diagnostic messages, to use a machine learning network, in particular a neural network, to assess the security relevance of the diagnostic messages, which has previously been trained using special inputs from operators of the technical installation, the operators having assessed past diagnostic messages with regard/respect to their security relevance. Furthermore, the computer-implemented analysis module is configured to forward the diagnostic messages previously identified as relevant to the computer-implemented adaptation module. The computer-implemented adaptation module is configured, if necessary, to adapt the diagnostic messages previously identified as relevant by the computer-implemented analysis module to requirements of the computer-implemented security module. Furthermore, the computer-implemented adaptation module is configured to forward the diagnostic messages previously received from the computer-implemented analysis module to the computer-implemented security module.

Here, an "operator station server" means a server that centrally detects data from an operator control and process monitoring system as well as generally alarm and measurement value archives of a process control system of a technical installation and makes it available to users. The operator station server generally establishes a communication link to automation systems of the technical installation and forwards data from the technical installation to what are known as clients, which are used for the control and monitoring of an operation of the individual functional elements of the technical installation. The operator station server can, without being restricted thereto, be a SIMATIC PCS 7 Industrial Workstation Server from SIEMENS.

Particularly preferably, the control system additionally has an operator station client that is configured to receive diagnostic messages from the operator station server and to present these to an operator of the technical installation. Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described properties, features and advantages of this invention, and the way in which they are achieved, become clearer and more readily understandable in connection with the following description of the exemplary embodiment, which is explained in greater detail in connection with the drawings, in which.

DETAILED DESCRIPTION OF THE EXEMPLARY EMBODIMENT

Figure 1:
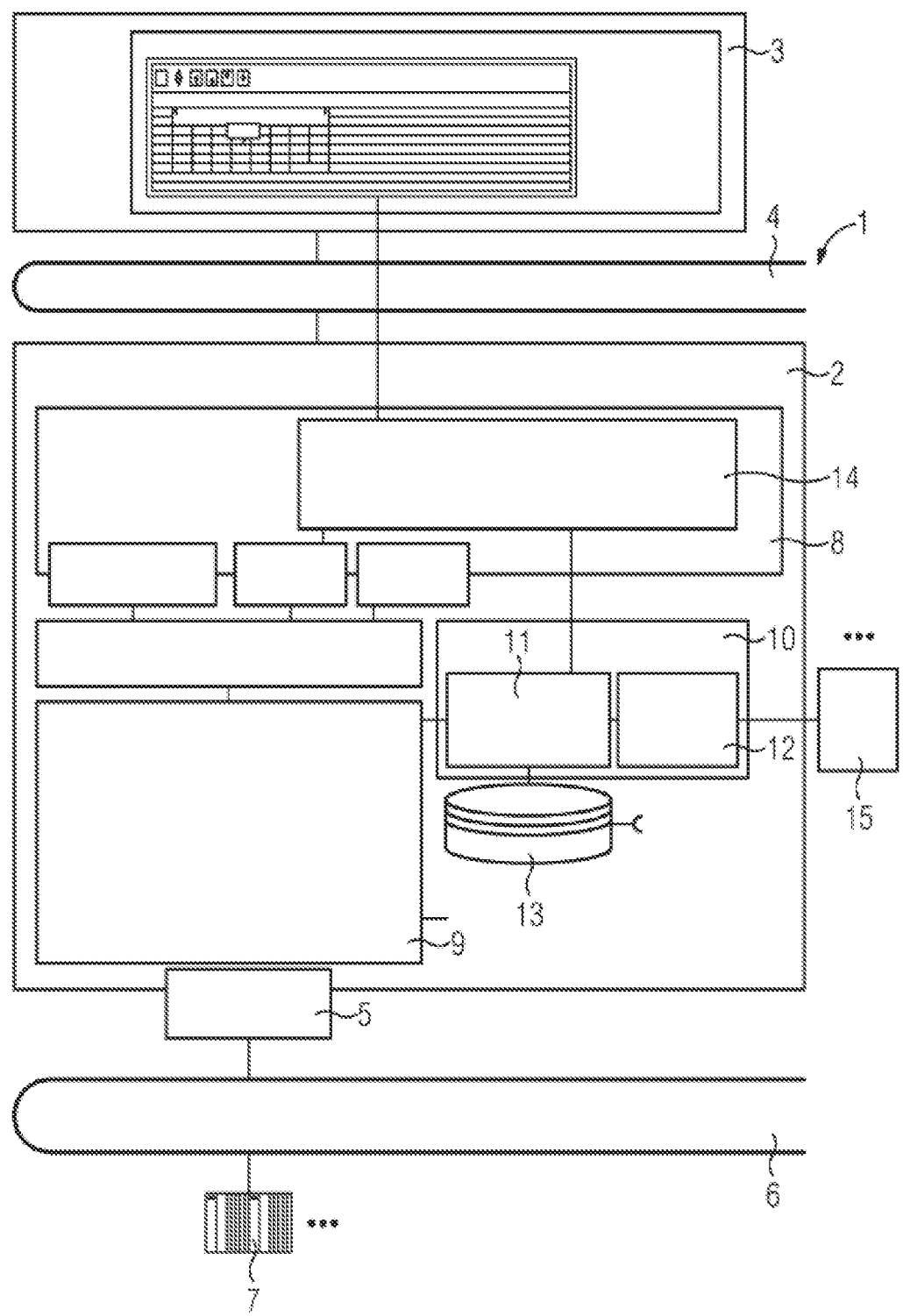
FIG. 1 is a schematic illustration of a technical installation formed as an industrial installation.

A part of an inventive control system 1 of a technical installation established as an industrial installation is represented in the FIG. 1. The control system 1 comprises a server of an operating system or an operator station server 2 and an associated operator station client 3. The operator station server 2 and the operator station client 3 are interconnected via a terminal bus 4 and to further components (not shown) of the control system 1 such as an engineering system server or a process data archive.

A user or operator has access to the operator station server 2 via the operator station server 3 via the terminal bus 4 in the context of control and process monitoring. The terminal bus 4 can, without being restricted thereto, be formed as an Industrial Ethernet, for example.

The operator station server 2 has a device interface 5 that is connected to an installation bus 6. Via this, the operator station server 2 can communicate with an (external) device 7. Here, the connected device 7 can alternatively also be an application, in particular a web application. For the purpose of the disclosed embodiments of the invention, any number of devices and/or applications can be connected to the operator station server 2. The installation bus 6 can, without being restricted thereto, be formed, for example, as an Industrial Ethernet. The device 7 can in turn be connected to any number of subsystems (not shown).

A visualization service 8 is integrated into the operator station server 2, via which a transmission of (visualization) data to the operator station client 3 can occur. Furthermore, the operator station server 4 has a process image 9 and an alarm service 10. In turn, the alarm service 10 comprises a computer-implemented analysis module 11 and a computer-implemented adaptation module 12.

The alarm service 10 accesses the process image 9, in order to obtain diagnostic messages from the individual devices 7. The received diagnostic messages are first analyzed by the computer-implemented analysis module 11 such that diagnostic messages relevant for the security of an operation of the technical installation are identified. To this end, the computer-implemented analysis module 11 accesses a database 13, in which rules for classification of the individual diagnostic messages with respect to the operating security of the technical installation are stored.

If necessary, the computer-implemented adaptation module 12 adapts the diagnostic message previously identified as relevant to particular specifications, such as the Common Event Format.

The diagnostic messages identified as relevant and optionally transformed are then transmitted to an alarm control 14 of the control system 1. The corresponding operating images of the alarm control 14 are graphically presented to an operator of the control system 1 on the operator station client 3. Furthermore, the cited diagnostic messages are transmitted to the computer-implemented security module 15 designed as a SIEM system for further processing.

If a new and unknown type of diagnostic message is received, then the alarm service 10 transmits to the operator, via the alarm control 14, the information that a new rule has to be stored in the database 13 in order to be able to proceed correctly with this type of diagnostic message in future.

Figure 2:
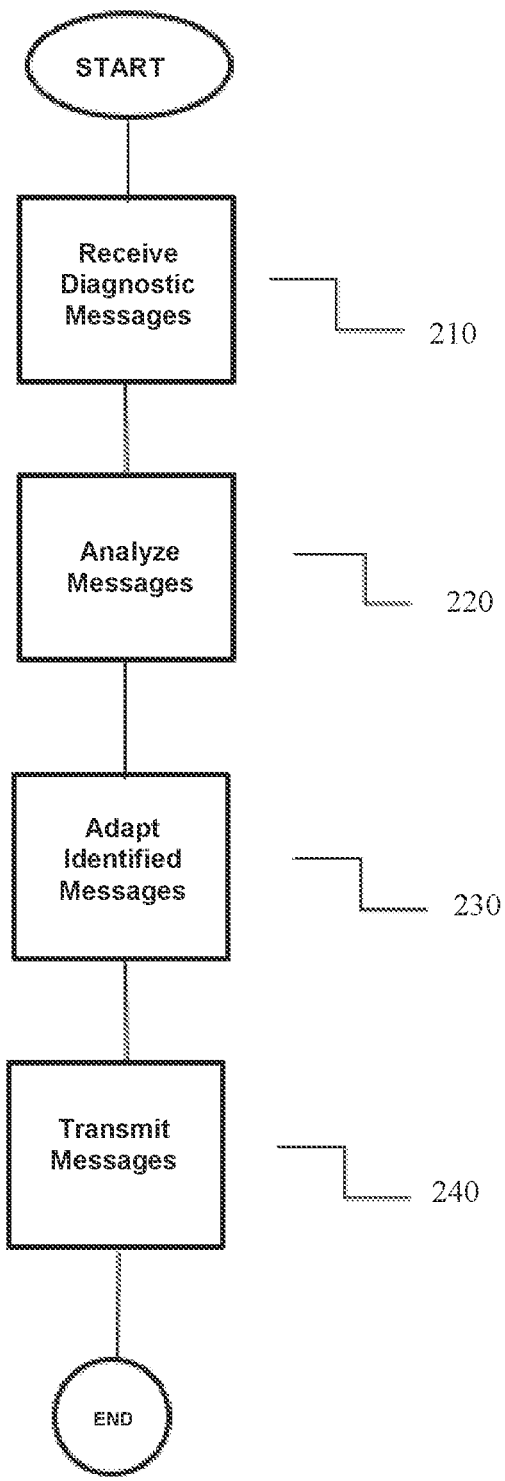
FIG. 2 is a flowchart of the method in accordance with the invention.

FIG. 2 is a flowchart of the method in accordance with the invention. The method comprises a) receiving diagnostic messages generated by technical objects 7 of a technical installation comprising a manufacturing or process installation, as indicated in step 210.

Next, b) analyzing the diagnostic messages are analyzed such that diagnostic messages relevant to security of an operation of the technical installation are identified via comparative data records, as indicated in step 220. In accordance with the invention, a machine learning network, preferably a neural network, is utilized to assess the security relevance of the diagnostic messages to analyze the diagnostic messages to assess the security relevance of the diagnostic messages, the neural network having previously been trained utilizing inputs from operators of the technical installation, and the operators having assessed past diagnostic messages with regard to their security relevance.

Next, c) the previously identified diagnostic messages are adapted to requirements of a computer-implemented security module 15 of the technical installation, if necessary, as indicated in step 230.

Next, d) the previously identified and optionally adapted diagnostic messages are transmitted to the computer implemented security module 15 of the technical installation, as indicated in step 240.

Although the invention has been illustrated and described in greater detailed by the preferred exemplary embodiment, the invention is not restricted by the disclosed examples and other variations can be derived therefrom by the person skilled in the art, without departing from the scope of protection of the invention.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method, comprising:
    a) receiving diagnostic messages generated by technical objects of a technical installation comprising a manufacturing or process installation;
    b) analyzing the diagnostic messages such that diagnostic messages which are relevant to security of an operation of the technical installation are identified via comparative data records and classifying individual diagnostic messages based on rules stored in a database, a machine learning network being utilized to assess the security relevance of the diagnostic messages and analyze the diagnostic messages to assess the security relevance of the diagnostic messages, said machine learning network being pre-trained utilizing inputs from operators of the technical installation, and said operators having assessed past diagnostic messages with regard to their security relevance;
    c) adapting the previously identified diagnostic messages to requirements of a computer-implemented security module of the technical installation, when necessary; and
    d) transmitting the previously identified and optionally adapted diagnostic messages to the computer-implemented security module of the technical installation.

2. The method as claimed in claim 1, wherein the diagnostic messages transmitted to the computer-implemented security module are graphically presented to an operator of the technical installation.

3. The method as claimed in claim 1, wherein at least one of (i) a message class and (ii) a message type of the diagnostic message is taken into account during automated assessment of the security relevance of a diagnostic message.

4. The method as claimed in claim 1, wherein the diagnostic messages previously identified as relevant are adapted to a standard data format before the diagnostic messages are transmitted to the computer-implemented security module of the technical installation.

5. The method as claimed in claim 4, wherein the standard data format comprises a Common Event Format.

6. The method as claimed in claim 1, wherein the machine learning network comprises a neural network.

7. A control system for a technical installation, comprising:
    an operator station server implemented in hardware and including a database;
    a computer-implemented analyzer;
    a computer-implemented adapter; and
    a computer-implemented security module, the analyzer and the adapter being implemented on the operator station server;
    wherein the computer-implemented analyzer receives diagnostic messages generated by technical objects of a technical installation and analyzes the diagnostic messages such that diagnostic messages relevant for security of an operation of the technical installation are identified and classified based on rules stored in the database;

wherein the computer-implemented analyzer utilizes a machine learning network to analyze the diagnostic messages to assess the security relevance of the diagnostic messages, said machine learning network being pre-trained utilizing inputs from operators of the technical installation, and said operators having assessed past diagnostic messages with respect to their security relevance;

wherein the computer-implemented analyzer forwards the diagnostic messages previously identified as relevant to the computer-implemented adapter;

wherein the computer-implemented adapter, when necessary, adapts the diagnostic messages previously identified as relevant by the computer-implemented analyzer to requirements of the computer-implemented security module; and wherein the computer-implemented analyzer forwards the diagnostic messages previously received from the computer-implemented analyzer to the computer-implemented security module.

8. The control system as claimed in claim 7, further comprising:

an operator station client configured to receive diagnostic messages from the operator station server and to present said received diagnostic messages to an operator of the technical installation.

9. The control system as claimed in claim 7, wherein the technical installation comprises a manufacturing or process installation.

10. The control system as claimed in claim 7, where the machine learning network comprises a neural network.

* * * * *